3,335,019
PROCESS OF MAKING GROUND CONDITIONER
Fay E. Marshall, 87 Selby Lane, Atherton, Calif. 94025, and Winifred A. K. Gould, 511 Iris St., Redwood City, Calif. 94062
No Drawing. Filed May 4, 1964, Ser. No. 364,770
3 Claims. (Cl. 106—135)

It is proposed in this invention to provide a ground conditioner that may be used to loosen hard top and clay-like soils. The process of making the ground conditioner will be set forth first and then the ingredients of the composition of matter will be described.

In order to make a base for the ground conditioner, the steps are set forth as follows:

(1) Boil one pound of lime, one pound of sodium bicarbonate, one pound of calcium carbonate, and one pound of sulphur, together with three gallons of water until the mixture bubbles and forms hexagonal shaped bubbles on top of the mixture.

(2) Then one-third pound of sodium hydroxide is added carefully in order not to make the solution boil too vigorously.

(3) Thereafter the resulting red liquid is filtered off and used as a base for the ground conditioner.

These proportions of ingredients should be approximately used for the following reasons:

*As to the lime.*—If too much lime is used, then too much calcium polysulfite will be formed. If not enough lime is used, then the polysulfiite content in the finished base will not equal the concentration for a good colloidal mixture.

*As to the sodium bicarbonate.*—If too much sodium bicarbonate is used, then a greater amount of sodium polysulfiite will be obtained and the colloidal particles in the finished base will be too large and these particles will precipitate or settle out. If not enough sodium bicarbonate is used, the solution will be too pale and will not have a good red color, and it will make less sulphur go into solution. This also acts as a buffer to make a better resulting colloid in the finished product.

*As to the calcium carbonate.*—If too much calcium carbonate is used, there will be too much calcium polysulfite formed. If not enough calcium carbonate is used, then the calcium polysulfide in the finished base will not equal the concentration desired for a good colloidal mixture and a precipitate will result, leaving a clear solution above the precipitate, and no colloidal mixture will be obtained.

*As to the sulphur.*—If too much sulphur is used, it will leave the excess on the bottom of the container and will be wasted. If not enough sulphur is used, then the proper sulphur content will not be present to produce the desired colloidal mixture and it will be too thin. A deep red solution should result.

*As to the water.*—The three gallons of water is critical, since this amount of water will take up one pound of sulphur and the proper sulphur content will be present in the base solution.

In using the foregoing base, eight ounces thereof is stirred into eight ounces of 10% warm gelatin, agar, or other gelatinous material, or in the same proportions for large or smaller mixes, i.e., one part to one part. Sulfuric acid (concentrated) is added dropwise, with stirring until a milky solution is achieved. About two to ten cubic centimeters of the acid is required, but this depends upon the stirring and the temperature. This will bubble profusely, but on allowing to stand it will solidify into a semi-solid mass. This treatment causes the reaction between the acid and base to take place more slowly than in a liquid medium and upon cooling holds that reaction and allows precipitated particles to remain in colloidal size. The percentage of gelatin or gelatinous material makes a more or less solid resulting gel.

The resulting semi-solid mass is then dissolved at about 100° Fahrenheit, and will produce a milky colloidal solution that will not regel. This milky colloidal solution then can be dissolved at about six ounces per gallon of water added and this liquid further diluted with irrigation water in the proportion of one part in sixty parts to provide the finely divided colloid which will react with the very fine particles in hard-packed soil. These finely divided particles of soil conglomerate and allow the water to go into the soil.

In a solution containing approximately 50% active ingredients, about ten gallons may be used per acre.

As to the ingredients remaining in the final composition of matter comprising the ground conditioner, they comprise:
 (a) Colloidal sulphur;
 (b) Calcium sulfite;
 (c) Water.

As a variation in the manufacture of the base material, the following may be used: One pound of sulphur, two pounds of limestone chips, and one pound of sodium bicarbonate may be boiled in three to four gallons of water. When treated with one-third pound of sodium hydroxide in the manner previously described, a red liquid will result. This method or process is essentially the same as that set forth earlier, since limestone chips contain calcium and lime. These proportions of ingredients should be approximately used for the reasons outlined above.

Other methods of producing colloidal sulphur will not have a proper buffering system and will not form a colloid in sufficient concentration.

We claim:
1. In the herein described process of making a ground conditioner, the steps of:
 (A) making a base by:
  (1) boiling the following ingredients in approximately the proportions: one pound of lime, one pound of sodium bicarbonate, one pound of calcium carbonate, and one pound of sulphur, together with three gallons of water until the mixture bubbles and forms hexagonal shaped bubbles on top of the boiling mixture;
  (2) then adding approximately one-third pound of sodium hydroxide carefully in order not to make the solution boil too vigorously;
  (3) thereafter filtering off the resulting red liquid for use as a base for the ground conditioner;
 (B) stirring approximately one part of the base into one part warm gelatin or agar;
 (C) adding concentrated sulfuric acid drop-wise, with stirring until a milky solution is achieved;
 (D) allowing this milky solution to stand until it will solidify into a semi-solid mass and cooling to allow the precipitated particles to remain in colloidal size;
 (E) dissolving this cooled semi-solid mass in water at about 100° Fahrenheit to produce a milky colloidal solution that will not regel;
 (F) and dissolving this milky colloidal solution at about six ounces per gallon of water added.
2. The process of making a ground conditioner, as set forth in claim 1;
 (G) and in which the resulting liquid is further diluted with irrigation water in about the proportion of one part in sixty parts to provide a finely divided colloid.
3. In the herein described process of making a ground conditioner, the steps of:
 (A) making a base by:
  (1) boiling the following ingredients in approx- imately the proportions: one pound of sulphur, two pounds of limestone chips, and one pound of sodium bicarbonate, together with three to four gallons of water;
(2) then adding approximately one-third pound of sodium hydroxide carefully in order not to make the solution boil too vigorously;
(3) thereafter filtering off the resulting red liquid for use as a base for the ground conditioner;
(B) stirring approximately one part of the base into one part of warm gelatin or agar;
(C) adding concentrated sulfuric acid drop-wise, with stirring until a milky solution is achieved;
(D) allowing the milky solution to stand until it will solidify into a semi-solid mass and cooling to allow the precipitated particles to remain in colloidal size;
(E) dissolving this cooled semi-solid mass in water at about 100° Fahrenheit to produce a milky colloidal solution that will not regel;
(F) and dissolving this milky colloidal solution at about six ounces per gallon of water added.

No references cited.

MORRIS LIEBMAN, *Primary Examiner.*

ALAN LIEBERMAN, *Examiner.*